(12) United States Patent
Fukunaga et al.

(10) Patent No.: US 9,145,301 B2
(45) Date of Patent: Sep. 29, 2015

(54) METHOD FOR PRODUCING ALUMINUM NITRIDE POWDER

(71) Applicant: Tokuyama Corporation, Yamaguchi (JP)

(72) Inventors: Yutaka Fukunaga, Yamaguchi (JP); Yukihiro Kanechika, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 14/373,996

(22) PCT Filed: Mar. 27, 2013

(86) PCT No.: PCT/JP2013/059022
§ 371 (c)(1),
(2) Date: Jul. 23, 2014

(87) PCT Pub. No.: WO2013/146894
PCT Pub. Date: Oct. 3, 2013

(65) Prior Publication Data
US 2015/0086467 A1    Mar. 26, 2015

(30) Foreign Application Priority Data

Mar. 30, 2012 (JP) .................................. 2012-081720

(51) Int. Cl.
*C01B 21/072* (2006.01)

(52) U.S. Cl.
CPC ......... *C01B 21/0726* (2013.01); *C01B 21/0722* (2013.01); *C01P 2004/30* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| | | | |
|---|---|---|---|
| 4,615,863 A | 10/1986 | Inoue et al. | |
| 4,851,207 A | 7/1989 | Ichikawa et al. | |
| 2013/0164534 A1 | 6/2013 | Muneoka et al. | |
| 2013/0244036 A1 * | 9/2013 | Muneoka et al. | 428/402 |

FOREIGN PATENT DOCUMENTS

| | | |
|---|---|---|
| JP | 61083606 A | 4/1986 |
| JP | 62167208 A | 7/1987 |
| JP | 63151606 A | 6/1988 |
| JP | H0323206 A | 1/1991 |
| JP | H05117039 A | 5/1993 |
| JP | H05221618 A | 8/1993 |
| JP | 05270809   | 10/1993 |
| JP | H06191807 A | 7/1994 |
| JP | 2002179413 A | 6/2002 |
| JP | 2005162555 A | 6/2005 |
| JP | 2012056774 A | 3/2012 |

OTHER PUBLICATIONS

JP2012-056774 translation Feb. 22, 2015.*
English abstract of JPH0323206 (A)—Jan. 31, 1991.
English abstract of JP2005162555 (A)—Jun. 23, 2005.
English abstract of JPH05221618 (A)—Aug. 31, 1993.
English abstract of JPH05117039 (A)—May 14, 1993.
English abstract of JP2002179413 (A)—Jun. 26, 2002.
English abstract of JP2012056774 (A)—Mar. 22, 2012.
English abstract of JPH06191807 (A)—Jul. 12, 1994.
International application No. PCT/JP2013/059022, Notification of Transmittal of Copies of Translation of the International Preliminary Report on Patentability (Chapter I or Chapter II), dated Oct. 9, 2014.
English Abstract of JP 62167208.
English Abstract of JP 61083606.
English Abstract of JP 05270809.
English Abstract of JP 63151606.

* cited by examiner

*Primary Examiner* — Guinever S Gregorio
(74) *Attorney, Agent, or Firm* — Cahn & Samuels, LLP

(57) ABSTRACT

A method for producing an aluminum nitride powder includes mixing an alumina powder having an average particle diameter of not more than 5 μm; an eutectic melting agent; and a carbon powder are mixed to obtain a mixture thereof, and reductively nitriding the mixture by firing at a higher temperature than a melting point of the eutectic melting agent, while maintaining a nitrogen ratio within a range of 60 to 85 vol % in an atmosphere of mixed gases of nitrogen and carbon monoxide until a nitriding ratio of the alumina powder reaches at least 50%.

10 Claims, No Drawings

METHOD FOR PRODUCING ALUMINUM NITRIDE POWDER

This application is a U.S. national stage application of PCT/JP2013/059022 filed on 27 Mar. 2013, and claims priority to Japanese patent document 2012-081720 filed on 30 Mar. 2012, the entireties of which are incorporated herein by reference.

TECHNICAL FIELD

The present invention relates to a novel method for producing an aluminum nitride powder. Specifically, it provides a method for producing an aluminum nitride powder of a spherical shape having a large particle diameter that can be favorably used as a filler for heat radiating materials for improving heat radiating property by being filled in a resin, a grease, an adhesive or a coating material.

BACKGROUND ART

The aluminum nitride has a high thermal conductivity and an excellent electrical insulating property and it has been used as a high thermal conductive substrate, a heat radiating component, and an insulating/heat radiating filler. Recently, semiconductor electronic components such as IC and CPU mounted on high-performance electronic devices, represented by a notebook computer, an information terminal and the like, are downsized and highly integrated. In line with that, downsizing has become essential for heat radiating members. Examples of the heat radiating member include a heat radiating sheet and a film-like spacer in which a high thermal conductive filler is filled in the matrix such as resin and rubber (Patent Document 1), a heat radiating grease in which a high thermal conductive filler is filled in silicone oil to have fluidity (Patent Document 2), and a heat radiating adhesive in which a high thermal conductive filler is filled in an epoxy resin (Patent Document 3). Further, examples of the high thermal conductive filler include aluminum nitride, boron nitride, alumina, magnesium oxide, silica, graphite, and various metal powders.

In order to improve the thermal conductivity of the heat radiating materials, it is important that a filler having a high thermal conductivity is highly densely filled. For this purpose, it has been urged to provide an aluminum nitride powder of a spherical shape having a particle diameter of from about several microns to several tens of microns.

Usually, the aluminum nitride powder has been produced by a reduction-nitridation method which fires alumina and carbon in a nitrogen atmosphere, a direct nitridation method which reacts metal aluminum directly with nitrogen, and a gas-phase method which reacts alkylaluminum with ammonia, and thereafter heats them.

However, the aluminum nitride powders obtained by the reduction-nitridation method and by the gas-phase method have shapes close to a sphere but their particle diameters are about submicron size.

On the other hand, according to the direct nitridation method, the aluminum nitride powder is obtained through the pulverization and classification, thereby it enables relatively easily to control the particle size and also enables to obtain the aluminum nitride powder having a particle diameter of from about several microns to several tens of microns. However, the pulverization step is essential in this method, therefore the particles of the obtained aluminum nitride powder have an angular shape and that causes a decrease in fluidity, with the result that it is difficult to highly densely fill the aluminum nitride powder obtained by this method as a filler in the resin.

In view of the above, a variety of methods have been studied in order to obtain the aluminum nitride powder of a spherical shape having a desired average particle diameter.

For example, a Patent Document 4 discloses a method for obtaining an aluminum nitride powder of a rounded shape having an average particle diameter of not less than 3 µm by firing a mixture of an alumina powder and a carbon powder in an inert atmosphere to form an aluminum oxide allowing particles thereof to grow and then firing (nitriding) the particles thereof in a non-oxidizing atmosphere containing nitrogen. However, there is a problem that the aluminum nitride powder obtained by this method has an elliptic shape and exhibits low sphericalness.

Further, Patent Document 5 discloses a method for producing an aluminum nitride powder by using a mixed powder of an aluminum oxide powder, a carbon powder and a rare earth compound as a starting material. With this method, compared with the general reduction-nitridation method, it enables to obtain the aluminum nitride powder having a relatively large average particle diameter. However, the average particle diameter is approximately 3 µm, and it is difficult to obtain the aluminum nitride powder having an average particle diameter exceeding 5 µm.

Further, a Patent Document 6 discloses a method for producing an aluminum nitride powder by developing an amorphous aluminum nitride powder in a flux comprising compounds of alkaline earth metals, rare earth metals and the like so as to assume a spherical shape, and thereafter, dissolving the flux to isolate the aluminum nitride powder. With this method, it enables to obtain the aluminum nitride powder having an excellent fluidity and filling property. However, there is a problem that impurities such as oxygen and the like easily infiltrate into the aluminum nitride powder during the heat treatment process.

PRIOR ART DOCUMENTS

Patent Documents

Patent Document 1: Japanese Unexamined Patent Application Publication No. H3-23206
Patent Document 2: Japanese Unexamined Patent Application Publication No. 2005-162555
Patent Document 3: Japanese Unexamined Patent Application Publication No. H5-221618
Patent Document 4: Japanese Unexamined Patent Application Publication No. H3-23206
Patent Document 5: Japanese Unexamined Patent Application Publication No. H5-117039
Patent Document 6: Japanese Unexamined Patent Application Publication No. 2002-179413

SUMMARY OF THE INVENTION

It is therefore an object of the present invention to provide a method for producing an aluminum nitride powder of a spherical shape having a large average particle diameter (exceeding 5 µm, for example), and further usable as a filler for heat radiating materials having a high thermal conductivity and an excellent filling property.

In order to solve the above problems, the present inventors have conducted keen research, and have succeeded in obtaining an aluminum nitride powder having a desired particle diameter, by controlling a reaction atmosphere to a specific gas composition at least in the first half of the reduction-nitridation reaction of a mixed powder of a fine alumina powder having a specific particle diameter, a carbon powder, and a specific eutectic melting agent capable of melting together with the alumina, and allowing the spherical aluminum nitride particles formed by the reduction-nitridation method to grow larger.

Specifically, according to the present invention, there is provided a method for producing an aluminum nitride powder, comprising reductively nitriding an alumina powder, wherein the alumina powder having an average particle diameter of not more than 5 μm, an eutectic melting agent, and a carbon powder are mixed to obtain a mixture thereof, and the mixture is reductively nitrided by firing at a higher temperature than a melting point of the eutectic melting agent, while maintaining a nitrogen ratio within a range of 60 to 85 vol % in an atmosphere of mixed gases of nitrogen and carbon monoxide until a nitriding ratio of the alumina powder reaches at least 50%.

Further, in the above method, for the amount of the alumina powder, the eutectic melting agent, and the carbon powder that constituting the mixed powder, it is preferable that the eutectic melting agent is 0.5 to 50 parts by weight and the carbon powder is 30 to 50 parts by weight, with respect to 100 parts by weight of the alumina powder.

Furthermore, for the firing temperature, it is preferably at a higher temperature than the melting point of the eutectic melting agent and further is within a range of 1620° C. to 1800° C. so that it enables to stably conduct a nitridation reaction.

DETAILED DESCRIPTION OF THE INVENTION

According to the present invention, by a simple method for controlling the ratio of nitrogen and carbon monoxide under the reaction atmosphere at least in the first half of a reduction-nitridation reaction of an alumina using the eutectic melting agent, it enables to obtain spherical aluminum nitride particles having a large particle diameter, a low oxygen content, and a high thermal conductivity.

As for the mechanism for obtaining the spherical aluminum nitride powder of the present invention by the above production method, the present inventors presume as described below.

Specifically, according to the method of the present invention which uses the eutectic melting agent which is capable of melting together with the alumina having a specific fine average particle diameter, it enables easily to form an eutectic mixture with alumina under the specific temperature condition for reduction-nitridation. Therefore, the growth of alumina particles and mass transfer are remarkably accelerated. Further, by controlling the ratio of nitrogen and carbon monoxide under the reaction atmosphere at least in the first half of the reduction-nitridation reaction, it enables to inhibit a reaction rate of the reduction-nitridation and also enables to maintain a long-term function of growth of particles that forming the aluminum nitride by the eutectic melting agent during the reduction-nitridation, with the result that it enables to obtain the spherical aluminum nitride powder having a large particle diameter. Further, during the above reaction, oxygen is not infiltrated and therefore the obtained aluminum nitride powder has a low oxygen concentration and a high thermal conductivity.

The following is detailed explanations regarding a method for producing a spherical aluminum nitride powder of the present invention.

[Alumina Powder]

For alumina and the like used as a starting material of the spherical aluminum nitride powder of the present invention, it may be an alumina having a crystal structure such as of α, γ, θ, δ η, κ, χ, or may be boehmite, diaspore, gibbsite, bayerite, toddite and the like which are dehydrated and finally transited wholly or partly into an α-alumina by heating. They can be used in a single kind or as a mixture of two or more kinds. In the present invention, α-alumina, γ-alumina, and boehmite which have particularly high reactivities and are easily controlled are preferably used.

The average particle diameter of the alumina powder used in the present invention is not more than 5 μm, preferably 0.3 μm to 2 μm. When the above average particle diameter exceeds 5 μm, the reduction-nitridation reaction is difficult to proceed into the particle and alumina might remain inside. Further, the rate of mass transfer through the liquid phase decreases and thereby the sphericalness of the obtained aluminum nitride particles decreases. Further, although the average particle diameter of the above alumina powder is preferably not more than 5 μm, when it is extremely small, the reduction-nitridation reaction tends to be completed at a low temperature in short periods of time, and the growth of particles and the mass transfer hardly occur, with the result that it might become difficult to obtain the aluminum nitride particles having a large particle diameter. Therefore, it is preferable to use the alumina powder having an average particle diameter of not less than 0.1 μm. Further, the average particle diameter of the present invention is determined by the methods as described in Examples below. Furthermore, the specific surface area of the alumina powder is preferably 1 to 100 $m^2/g$, more preferably 2 to 50 $m^2/g$.

[Carbon Powder]

The carbon powder used in the present invention serves as a reducing agent, and may be a carbon black or a graphite powder. Further, as the carbon black, carbon blacks obtained by a furnace method or a channel method, or an acetylene black are preferably used. The specific surface area of the carbon black is arbitrarily determined, but it is preferably 0.01 $m^2/g$ to 500 $m^2/g$.

As a carbon source, there may be used a synthetic resin condensate such as a phenol resin, a melamine resin, an epoxy resin, and furan and phenol resins, a hydrocarbon such as pitch and tar, and an organic compound such as cellulose, sucrose, polyvinylidene chloride, and polyphenylene, as long as they do not impair the effects of the present invention.

[Eutectic Melting Agent]

The eutectic melting agent used in the present invention is a compound capable of melting together with alumina. Specifically, it is the one that comprises a compound of an alkaline earth metal and a compound of a rare earth metal, and is capable of melting together with the alumina at 1200° C. to 1800° C., preferably at 1300° C. to 1750° C. If a compound that is capable of melting together with the alumina at a temperature below 1200° C. is used as the eutectic melting agent, it volatilizes at a temperature range where the reduction-nitridation reaction proceeds and the effect as the eutectic melting agent might be reduced. Further, if a compound having the above temperature in excess of 1800° C. is used, the reduction-nitridation reaction proceeds before the liquid phase is formed, and therefore the mass transfer hardly occur and the liquid phase is not formed in sufficient amounts, with the result that it tends to result in insufficient growth of particles. As the eutectic melting agent, yttrium oxide, lithium oxide, cerium oxide, and calcium oxide and the like are preferably used. Among them, particularly yttrium oxide and calcium oxide are preferably used. Further, the average particle diameter of the eutectic melting agent is preferably 0.01 to 100 μm, more preferably 0.1 to 30 μm.

[Mixing the Starting Materials]

In the present invention, for the ratio of mixing an alumina powder, a carbon powder and an eutectic melting agent, the eutectic melting agent is preferably 0.5 to 50 parts by weight, more preferably 1 to 25 parts by weight, particularly preferably 2 to 10 parts by weight, and the carbon powder is preferably 30 to 50 parts by weight, more preferably 40 to 45 parts by weight, with respect to 100 parts by weight of the alumina powder.

Further, when the alumina powder is a hydrate, the usage thereof is determined in terms of alumina.

When the ratio of the carbon powder exceeds 50 parts by weight, it causes inhibition of contacts of the alumina particles with each other and the growth of particles is prevented, with the result that the average particle diameter of the obtained spherical aluminum nitride powder tends to be minute. Further, when the ratio of the carbon powder is less than 30 parts by weight, it causes frequent contacts of the alumina particles with each other and the particles aggregate together. Further, the carbon powder remains in small amounts after the reduction-nitridation reaction is completed and the aluminum nitrides join each other, with the result that it tends to result in an increase of aggregated powder.

Further, when the ratio of the eutectic melting agent is less than 0.5 parts by weight, the liquid phase is not formed in sufficient amounts, and the growth of particles and the mass transfer do not proceed, with the result that it might become difficult to assume the spherical shape. Further, when the ratio of the eutectic melting agent is more than 50 parts by weight, the eutectic melting agent remains a lot in the aluminum nitride powder, with the result that when such aluminum nitride powder is filled as a filler, the thermal conductivity tends to decrease.

In the present invention, as a method for mixing the alumina powder, the carbon powder and the eutectic melting agent, there is no specific limitation on the mixing method as long as the alumina, the carbon powder and the eutectic melting agent are homogeneously mixed together. However, usually, the mixing is preferably conducted by using a blender, a mixer or a ball mill.

[Reduction-Nitridation]

For the method for producing the spherical aluminum nitride powder of the present invention, in a firing furnace, the alumina powder, the eutectic melting agent, and the carbon powder are mixed to obtain a mixture thereof, and the mixture is reductively nitrided by firing at a higher temperature than a melting point of the eutectic melting agent, while maintaining a nitrogen ratio within a range of 60 to 85 vol %, preferably within a range of 65 to 80 vol % in an atmosphere of mixed gases of nitrogen and carbon monoxide until a nitriding ratio of the alumina powder reaches at least 50%. Further, the carbon monoxide may be partially replaced by an inert gas such as argon. However, in that case, compared with the carbon monoxide, the effect of inhibiting the nitridation reaction is reduced, therefore it is preferable to use the carbon monoxide.

Further, in the present invention, the ratio of nitrogen and carbon monoxide in the above firing furnace is determined by the analysis value of the exhaust gas composition in the firing furnace.

At the time that the nitriding ratio is lower than 50%, if the nitrogen ratio is out of the above range, for example, if the nitrogen ratio exceeds 85 vol %, the reduction-nitridation reaction proceeds quickly and the aluminum nitride particles are formed even if the particles are not grown to a sufficient degree, with the result that it is unable to obtain the aluminum nitride particles having a desired large particle diameter. Further, if the nitrogen ratio is less than 60 vol %, the effect of inhibiting the nitridation reaction is too strong and it takes a long time for the nitridation reaction. In some cases, unreacted alumina may remain or byproducts such as oxynitride may be formed.

In the present invention, it is recommended that the ratio of nitrogen and carbon monoxide in a reaction atmosphere is adjusted by analyzing the composition of the atmosphere gas and then determining the supply of nitrogen gas and carbon monoxide gas so as to satisfy the above range. However, this adjustment can also be performed by limiting the supply of the nitrogen gas. Further, as the nitridation reaction proceeds, the nitrogen is consumed and the carbon monoxide is generated ($Al_2O_3 + 3C + N_2 \rightarrow 2AlN + 3CO$). For this reason, the composition of the introduced gas and that of the reaction atmosphere might not correspond with each other. Therefore, it is preferable to monitor the composition of the exhaust gas and then adjust the composition of the introduced gas.

Further, in the present invention, the ratio of nitrogen and carbon monoxide may be adjusted in the above range at least by the time that the nitriding ratio of the alumina powder exceeds 50%. However, if the whole process of the nitridation reaction is conducted in accordance with the above conditions, it takes a great deal of time. Therefore, at the time that the nitriding ratio reaches approximately 80%, preferably 60%, it is preferable to accelerate the reduction-nitridation reaction by adjusting the nitrogen ratio larger than the above range. Further, for the nitriding ratio during the reaction, it is preferable to previously conduct nitridation reactions under the same condition and confirm the nitriding ratios by occasionally taking samples.

In a method for producing the spherical aluminum nitride powder of the present invention, the reduction-nitridation reaction is conducted by adjusting the reaction atmosphere as mentioned above, at a temperature of preferably 1620° C. to 1800° C., more preferably 1650° C. to 1750° C. for preferably 2 to 50 hours, more preferably 10 to 20 hours. The above time and temperature may be selected so that the eutectic melting agent melts while the reduction-nitridation reaction is conducted and further it does not completely volatilize during the reaction.

Further, if the above firing temperature is lower than 1620° C., the surfaces of the aluminum nitride particles are not smoothed to a sufficient degree, with the result that it might become difficult to highly densely fill the aluminum nitride powder in the resin. On the other hand, if the above firing temperature exceeds 1800° C., the reduction-nitridation reaction is completed in short periods of time, and the growth of particles and the mass transfer do not sufficiently proceed, with the result that it might become difficult to obtain a large aluminum nitride particles. Further, the eutectic melting agent easily volatilizes and thereby the effect of promoting the growth of particles and the mass transfer by the addition of the eutectic melting agent tends to decrease.

Further, if the time involved with the above reduction-nitridation is less than 2 hours, the nitridation reaction is not completed, thereby the alumina remains and the thermal conductivity decreases. Further, the aluminum nitride particles fail to assume the spherical shape, with the result that it might become difficult to highly densely fill the aluminum nitride powder in the resin. On the other hand, if the firing time exceeds 50 hours, the aluminum nitride particles join each other and coarse particles tend to be formed, with the result that the filling property to the resin tends to get worse.

Further, in the reaction, the conditions such as a temperature rising rate and a holding time while the temperature is rising can be determined by adopting the publicly known conditions without specific limitations.

[Oxidation]

In the present invention, the aluminum nitride powder obtained through the reaction contains excess of carbon powder. Therefore, it is preferable to remove the excess of carbon powder by conducting the oxidation treatment as necessary. As the oxidizing gas when conducting the oxidation treatment, any gas such as the air, oxygen, or carbon dioxide can be used without limitations as long as it enables to remove carbon. However, from the standpoint of economy and the oxygen concentration in the obtained aluminum nitride, the air is preferred. Further, the treating temperature is usually 500° C. to 900° C., more preferably 600° C. to 750° C.

If the oxidizing temperature is too high, the surface of the aluminum nitride is oxidized to an excess degree and the thermal conductivity of the aluminum nitride decreases. Further, if the oxidizing temperature is too low, the excess of carbon powder cannot completely be removed and it remains as impurity. Therefore, it is preferable to select a suitable oxidizing temperature and time.

[Use]

By utilizing the properties of the aluminum nitride, the spherical aluminum nitride powder of the present invention can be widely used for a variety of uses, specifically, as a filler for heat radiating materials such as heat radiating sheet, heat radiating grease, heat radiating adhesive, coating material and heat conductive resin.

Here, as the resin or grease that serve as the matrix of the heat radiating material, thermosetting resins such as epoxy resin and phenol resin, thermoplastic resins such as polyethylene, polypropylene, polyamide, polycarbonate, polyimide and polyphenylene sulfide, rubbers such as silicone rubber, EPR and SBR, and silicone oils are exemplified.

Among them, as the matrix of the heat radiating material, it is preferable, for example, to use an epoxy resin or a silicone resin. In order to obtain a highly flexible heat radiating material, it is desirable to use a silicon rubber of the addition reaction type.

In order to improve the thermal conductivity of the heat radiating material, it is desirable to add the filler in an amount of 150 to 1000 parts by weight, with respect to 100 parts by weight of the resin, rubber or oil. In addition to the spherical aluminum nitride powder of the present invention, the heat radiating material may be filled with any one or a plurality of the fillers such as alumina, boron nitride, zinc oxide, nitrogen carbide and graphite. The shapes and average particle diameters of the spherical aluminum nitride powder of the present invention and other fillers may be selected depending on the properties and use of the heat radiating material. These fillers may be treated for their surfaces with, for example, a silane coupling agent, phosphoric acid or phosphate. Further, the ratio of mixing the spherical aluminum nitride powder and other fillers in the heat radiating material can be suitably adjusted over a range of from 1:99 to 99:1. Further, the heat radiating material may be further blended with additives such as plasticizer, vulcanizing agent, cure promoter, parting agent and the like.

The above resin composition can be produced by being mixed using a blender or a mixer. The heat radiating material can be produced by forming the resin composition by the press-forming method, extrusion-forming method or doctor blade method followed by heat-curing.

EXAMPLES

The present invention will now be described more concretely. However, the present invention is not limited to these Examples only. Properties in Examples and in Comparative Examples were measured by the method described below.

(1) Specific Surface Area

The specific surface area was measured according to a BET single point method.

(2) Average Particle Diameter

By using a homogenizer, the sample was dispersed in an aqueous solution containing 5% of sodium pyrophosphate to measure the average particle diameter ($D_{50}$) by using a laser diffraction particle size distribution meter (MICROTRAC HRA manufactured by Nikkiso Co., Ltd).

(3) Aluminum Nitride Conversion

Relying on an X-ray diffraction (Cuk$\alpha$, 10 to 70°), the aluminum nitride conversion was obtained by a ratio of a peak intensity of a major peak of the aluminum nitride (AlN) (peak stemming from a plane (100)) and a sum of peak intensities of major peaks of alumina components ($\alpha$-alumina, $\theta$-alumina, $\gamma$-alumina, $\delta$-alumina and the like) by using a calibration curve method (formula (1)).

[Formula 1]

$$\text{Aluminum nitride conversion (\%)} = \frac{\text{peak intensity of the AlN}}{\text{peak intensity of the AlN} + \text{sum of peak intensities of each alumina component}} \times 100 \quad (1)$$

Examples of major peaks of the alumina components
$\alpha$-alumina: peak stemming from the plane (113)
$\gamma$-alumina: peak stemming from the plane (400)
$\theta$-alumina: peak stemming from the plane (403)
$\delta$-alumina: peak stemming from the plane (046)

Example 1

An $\alpha$-alumina having an average particle diameter of 1.2 μm and a specific surface area of 10.7 m$^2$/g, a carbon black having a specific surface area of 125 m$^2$/g, and a yttrium oxide having an average particle diameter of 1 μm were mixed.

The carbon black was mixed at a ratio of C/Al$_2$O$_3$=0.42 with respect to the alumina powder, and the yttrium oxide serving as the eutectic melting agent was mixed thereto in an amount of 5 parts by weight with respect to 100 parts by weight of the $\alpha$-alumina.

The above mixed powder was fired under the conditions of a firing temperature of 1700° C. for a firing time of 10 hours. In the first two hours of the firing time, a mixed gas of nitrogen and carbon monoxide was allowed to circulate to make the ratio of nitrogen and carbon monoxide in the atmosphere 80 vol % and 20 vol %. After two hours, only nitrogen was allowed to circulate to make the nitrogen ratio not less than 90 vol %.

Further, the ratio of the atmosphere gas was obtained by measuring the exhaust gas in the firing furnace, and the flow rate of nitrogen and carbon monoxide introduced in the firing furnace was controlled based on the above measurement value.

The nitrided powder was oxidized in the air atmosphere at 700° C. for 10 hours to obtain the aluminum nitride powder. The obtained powder was measured for its specific surface area, average particle diameter, and aluminum nitride conversion with the methods described above. The results are shown in Table 1.

In order to confirm the nitriding ratio at a stage of controlling the nitrogen ratio in this Example, a reaction wherein the nitrogen ratio was controlled to 80% was conducted for two hours and thereafter firing was stopped to lower the temperature. After that, the aluminum nitride conversion was measured, and the conversion thereby obtained was 73%.

Example 2

Aside from changing the ratio of nitrogen and carbon monoxide in the atmosphere in the first two hours of the firing time into 75 vol % and 25 vol %, an aluminum nitride powder was obtained in the same way as in Example 1. The obtained powder was measured for its specific surface area, average particle diameter, and aluminum nitride conversion with the methods described above. The results are shown in Table 1.

In order to confirm the nitriding ratio at a stage of controlling the nitrogen ratio in this Example, a reaction wherein the nitrogen ratio was controlled to 75% was conducted for 2 hours and thereafter firing was stopped to lower the temperature. After that, the aluminum nitride conversion was measured, and the conversion thereby obtained was 69%.

Example 3

Aside from changing the ratio of nitrogen and carbon monoxide in the atmosphere in the first 2 hours of the firing time into 67 vol % and 33 vol %, an aluminum nitride powder was obtained in the same way as in Example 1. The obtained powder was measured for its specific surface area, average particle diameter, and aluminum nitride conversion with the methods described above. The results are shown in Table 1.

In order to confirm the nitriding ratio at a stage of controlling the nitrogen ratio in this Example, a reaction wherein the nitrogen ratio was controlled to 67% was conducted for 2 hours and thereafter firing was stopped to lower the temperature. After that, the aluminum nitride conversion was measured, and the conversion thereby obtained was 60%.

TABLE 1

| | | Example 1 | Example 2 | Example 3 |
|---|---|---|---|---|
| AlN Powder | Average Particle Diameter (μm) | 5.1 | 6.3 | 7.8 |
| | Specific Surface Area (m$^2$/g) | 1.02 | 0.83 | 0.68 |
| | AlN Conversion (%) | 100 | 100 | 100 |

Comparative Example 1

Aside from changing the ratio of nitrogen and carbon monoxide in the atmosphere in the first 2 hours of the firing time into 90 vol % and 10 vol %, an aluminum nitride powder was obtained in the same way as in Example 1. The obtained powder was measured for its specific surface area, average particle diameter, and aluminum nitride conversion with the methods described above. The results are shown in Table 2.

In order to confirm the nitriding ratio at a stage of controlling the nitrogen ratio in this Comparative Example, a reaction wherein the nitrogen ratio was controlled to 90% was conducted for 2 hours and thereafter firing was stopped to lower the temperature. After that, the aluminum nitride conversion was measured, and the conversion thereby obtained was 81%.

Comparative Example 2

Aside from changing the firing time in which the nitrogen ratio was set to 80% into 0.5 hours, an aluminum nitride powder was obtained in the same way as in Example 1. The obtained powder was measured for its specific surface area, average particle diameter, and aluminum nitride conversion with the methods described above. The results are shown in Table 2.

In order to confirm the nitriding ratio at a stage of controlling the nitrogen ratio in this Comparative Example, a reaction wherein the nitrogen ratio was controlled to 80% was conducted for 0.5 hours and thereafter firing was stopped to lower the temperature. After that, the aluminum nitride conversion was measured, and the conversion thereby obtained was 35%.

TABLE 2

| | | Comparative Example 1 | Comparative Example 2 |
|---|---|---|---|
| AlN Powder | Average Particle Diameter (μm) | 3.0 | 4.2 |
| | Specific Surface Area (m$^2$/g) | 2.11 | 1.62 |
| | AlN Conversion (%) | 100 | 100 |

The invention claimed is:

1. A method for producing an aluminum nitride powder, comprising reductively nitriding an alumina powder, wherein:
   the alumina powder having an average particle diameter of not more than 5 μm, an eutectic melting agent, and a carbon powder are mixed to obtain a mixture thereof, and
   the mixture is reductively nitrided by firing at a higher temperature than a melting point of the eutectic melting agent, while maintaining a nitrogen percentage within a range of 60 to 85 vol % in an atmosphere of mixed gases of nitrogen and carbon monoxide until an aluminum nitride conversion percentage of the alumina powder reaches at least 50%.

2. The method for producing an aluminum nitride powder as set forth in claim 1, wherein with respect to 100 parts by weight of the alumina powder, 0.5 to 50parts by weight of the eutectic melting agent and 30 to 50 parts by weight of the carbon powder are mixed.

3. The method for producing an aluminum nitride powder as set forth in claim 2, wherein the firing temperature is higher than the melting point of the eutectic melting agent and is within a range of 1620° C. to 1800° C.

4. The method for producing an aluminum nitride powder as set forth in claim 3, wherein the eutectic melting agent is yttrium oxide.

5. The method for producing an aluminum nitride powder as set forth in claim 2, wherein the eutectic melting agent is yttrium oxide.

6. The method for producing an aluminum nitride powder as set forth in claim 1, wherein the firing temperature is higher than the melting point of the eutectic melting agent and is within a range of 1620° C. to 1800° C.

7. The method for producing an aluminum nitride powder as set forth in claim 6, wherein the eutectic melting agent is yttrium oxide.

8. The method for producing an aluminum nitride powder as set forth in claim 1, wherein the eutectic melting agent is yttrium oxide.

9. A method for producing an aluminum nitride powder, comprising:
   mixing alumina powder having an average particle diameter of not more than 5 μm, an eutectic melting agent, and a carbon powder to obtain a mixture thereof, and reductively nitriding the mixture by firing at a higher temperature than a melting point of the eutectic melting agent, while maintaining a nitrogen percentage within a range of 60 to 85 vol % in an atmosphere of mixed gases of nitrogen and carbon monoxide until an aluminum nitride conversion percentage of the alumina powder reaches at least 50%.

10. The method for producing an aluminum nitride powder as set forth in claim 9, wherein the eutectic melting agent is yttrium oxide.

* * * * *